United States Patent [19]

Rysti

[11] 4,144,976
[45] Mar. 20, 1979

[54] METHOD AND APPARATUS FOR PROVIDING LUMBER STACKS WITH STICKERS

[76] Inventor: Alpo Rysti, Frisansintie 22, 02240 Espoo 24, Finland

[21] Appl. No.: 835,043

[22] Filed: Sep. 21, 1977

[30] Foreign Application Priority Data

Jan. 20, 1977 [FI] Finland .................. 770192

[51] Int. Cl.$^2$ ............................................. B65G 57/26
[52] U.S. Cl. ...................................... 414/42; 198/371; 198/487; 198/680; 414/85; 414/786
[58] Field of Search .................. 214/6 M, 6 DK, 6 H, 214/152; 198/371, 477, 484, 680

[56] References Cited

U.S. PATENT DOCUMENTS

| | | | |
|---|---|---|---|
| 2,998,147 | 8/1961 | Rysti | 214/6 H |
| 3,388,784 | 6/1968 | Gartner | 214/6 DK X |
| 3,393,812 | 7/1968 | Mayo et al. | 214/6 DK |
| 3,738,510 | 6/1973 | Mason | 214/6 M X |
| 3,823,834 | 7/1974 | Rysti | 214/6 DK |

FOREIGN PATENT DOCUMENTS

| | | | |
|---|---|---|---|
| 1531100 | 7/1969 | Fed. Rep. of Germany | 198/484 |
| 372123 | 3/1973 | U.S.S.R. | 214/6 DK |

Primary Examiner—L. J. Paperner
Attorney, Agent, or Firm—Steinberg & Blake

[57] ABSTRACT

A method and apparatus for providing lumber stacks with stickers includes a suitable conveyer which is operated to situate a plurality of stickers over the uppermost lumber layer of a lumber stack during formation thereof. The stickers are carried to a predetermined position over the uppermost lumber layer by way of support members of the conveyer, these support members being substantially L-shaped and having bottom legs which project forwardly from bottom ends of upright legs thereof in the direction of travel of the stickers to the position over the stack, and the upright legs of the support members are situated behind the stickers at this time. A number of removing members are also situated behind the stickers when the latter are in the position over the stack to be deposited thereon. The removing members and the support members which carry the stickers to be deposited on the stack form two groups of members at least one of which is moved relative to the other in a direction which will displace the stickers from the support members so that the stickers are released to be deposited on the uppermost lumber layer of the stack which is being formed.

14 Claims, 8 Drawing Figures

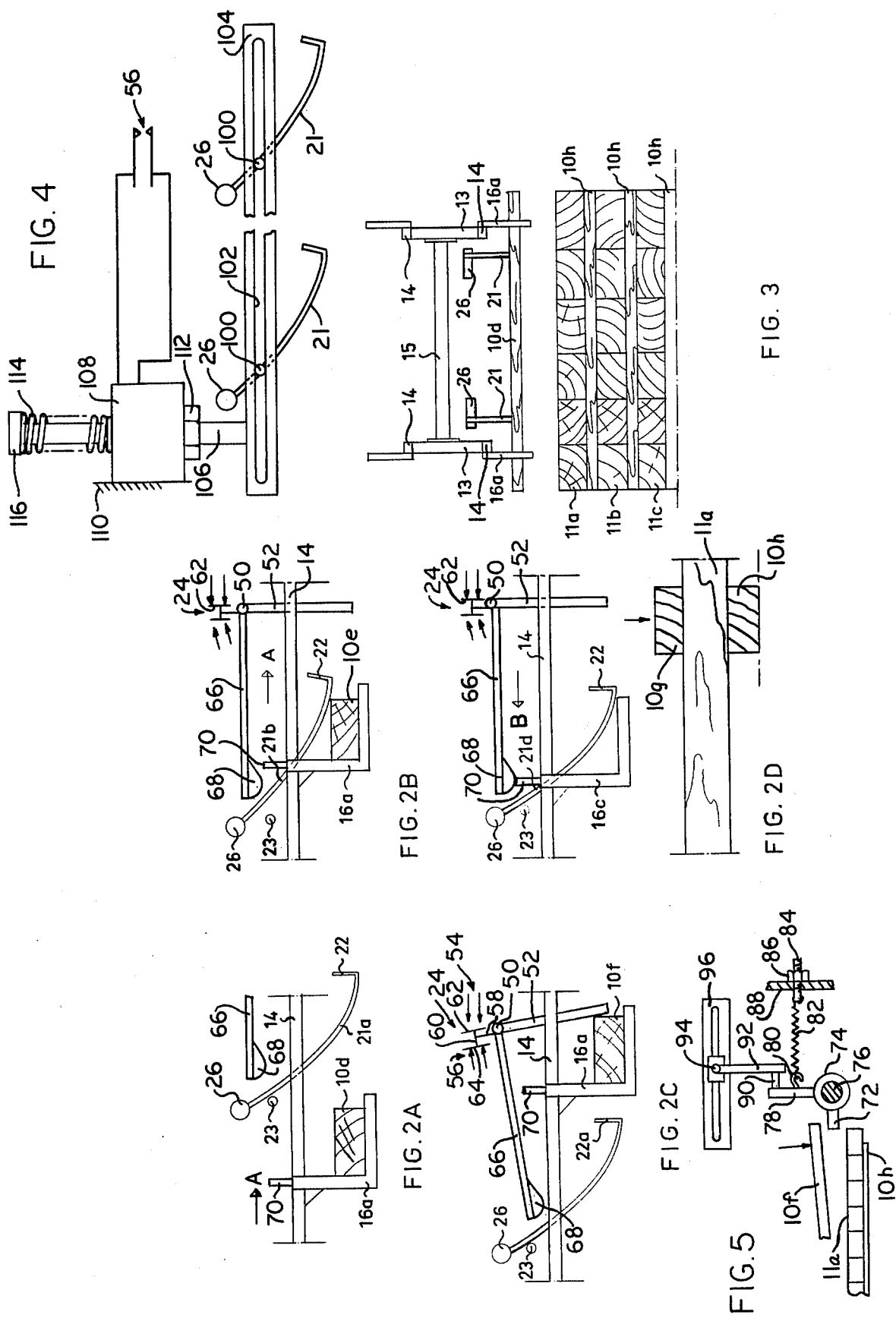

METHOD AND APPARATUS FOR PROVIDING LUMBER STACKS WITH STICKERS

BACKGROUND OF THE INVENTION

The present invention relates to methods and apparatus for forming stacks of lumber, and in particular to a method and apparatus for providing such stacks with stickers.

As is well known, stickers are utilized in the lumber industry for spacing lumber layers apart from each other in a stack. The stickers are generally in the form of elongated slats of rectangular cross section and are positioned between the layers of lumber during formation of the lumber stack. Several such stickers are generally situated between a pair of lumber layers while the stack is being formed. Thus, the stickers separate the layers of lumber and enable the entire stack to be dried evenly in a kiln, for example, so as to prevent or minimize subsequent warping or shrinkage of the individual lumber components.

Thus, the present invention relates to a method for situating stickers between a pair of successive lumber layers of a lumber stack so as to promote drying of the timber and/or keeping the timber together in a stack. Such stickers may be situated between separate layers of lumber or between groups of lumber layers. The stickers of course extend transversely with respect to the timber which forms a layer of the stack. The spacing between the stickers is such that it corresponds to the spacing between the stickers as they are transported by a conveyer to the stack to be deposited on the uppermost lumber layer thereof during formation of the lumber stack.

Also, the invention relates to an apparatus for carrying out a method as referred to above, this apparatus including a conveyer as referred to above having the capability of spacing the stickers at the required spacing from each other as they are transported to a position over the uppermost lumber layer during formation of the lumber stack. When the stickers are thus situated over the uppermost layer the apparatus operates to remove the stickers from the conveyer so that the stickers will be displaced to become deposited upon the uppermost lumber layer.

With respect to the state of the prior art pertaining to the invention, reference may be made, for example, to Swedish patent No. 225,851 as well as to U.S. Pat. No. 3,823,834. With a method and apparatus as shown in the latter patent, a suitable structure is provided for moving up beneath the stickers to raise them from conveyer members and for then lowering the stickers onto the uppermost layer of the stack which is being formed. With an apparatus of this latter type the conveyer has support members which carry the stickers to a position over the stack, and these support members support the stickers by way of elements which extend in a direction opposite to the direction of travel of the conveyer.

Thus, while it is indeed possible with prior art methods and apparatus to bring about the desired results, the methods and apparatus of the prior art are relatively complex and are not as reliable as desired in their operation, while at the same time requiring an undesirably long interval for the purpose of depositing the stickers on the uppermost lumber layer during formation of a lumber stack.

SUMMARY OF THE INVENTION

It is accordingly a primary object of the present invention to provide a method and apparatus which will avoid the above drawbacks.

In particular, it is an object of the present invention to provide a method and apparatus which are far simpler and which are more reliable in operation than previously known methods and apparatus.

A further object of the present invention is to provide a method and apparatus according to which it becomes possible very easily and quickly simply to drop the stickers onto the uppermost lumber layer of a lumber stack during formation thereof, although the present invention also includes the possibility of supporting the stickers at least in part, after they are removed from the conveyer, by structure which can lower at least part of the stickers onto the stack so as to prevent undesirable bouncing of the stickers which might result from simple dropping thereof. In the case where a structure is provided for lowering at least part of the stickers onto the stack, it is possible to use for this purpose a structure of the type disclosed in the above U.S. Pat. No. 3,823,834.

According to the method of the invention, the stickers are transported to a predetermined position over the uppermost layer of a lumber stack during formation thereof, with the stickers at this time being carried by support members of substantially L-shaped configuration having lower horizontal legs which point in the direction of travel of the stickers to the above predetermined position, these lower legs projecting forwardly from upright legs which extend upwardly from the lower legs of the support members and which are situated behind the stickers. A group of removing members are situated behind the stickers which reach the predetermined positions over the stack while supported by a group of the above support members. Then, one of these groups of members is moved relative to the other in a direction which will displace the stickers from the support members so that the stickers are free to fall onto the uppermost lumber layer of the stack which is being formed. Preferably the conveyer, after transporting the stickers to the predetermined position over the stack which is being formed, has its movement reversed so that in this way the support members of the conveyer bring the stickers into engagement with the removing members which engage the rear surfaces of the stickers to prevent the continued movement thereof with the rearwardly moving support members, so that in this way the latter move away from beneath the stickers which thus become free to fall onto the timber stack.

According to the apparatus of the invention, the conveyer means has upper and lower runs from which the substantially L-shaped support members project with the lower run at least being horizontal and carrying the support members in such a way that the upright legs thereof extend downwardly from the lower run while the lower legs thereof extend forwardly from the upright legs in the direction of travel of the lower run of the conveyer means. A feed means feeds stickers to the conveyer means to be carried by the support members thereof to the predetermined position over the stack which is being formed. The removing means becomes situated behind the stickers, the removing means being carried by a support means in such a way that the removing means can move up out of the path of movement of the stickers and then down behind the latter to become situated behind the stickers which are at the predetermined position, and by way of a suitable control means either the conveyer means or the removing means is moved one with respect to the other in such a way that the stickers are removed from the support members of the conveyer means so as to be capable of being deposited on the stack.

BRIEF DESCRIPTION OF DRAWINGS

The invention is illustrated by way of example in the accompanying drawings which form part of this application and in which:

FIGS. 2A–2D respectively illustrate several stages in the operation of the apparatus and method of the invention in connection with the first of a group of stickers which are to be deposited on a lumber stack during formation thereof;

FIG. 3 is a transverse schematic elevation of the structure and method of FIG. 1 taken along line III—III of FIG. 1 in the directions of the arrows;

FIG. 4 is a schematic illustration of another embodiment of the method and apparatus according to the invention; and FIG. 5 is a schematic fragmentary elevation of yet another embodiment of the method and apparatus of the invention.

DESCRIPTION OF PREFERRED EMBODIMENTS

Figure 1:
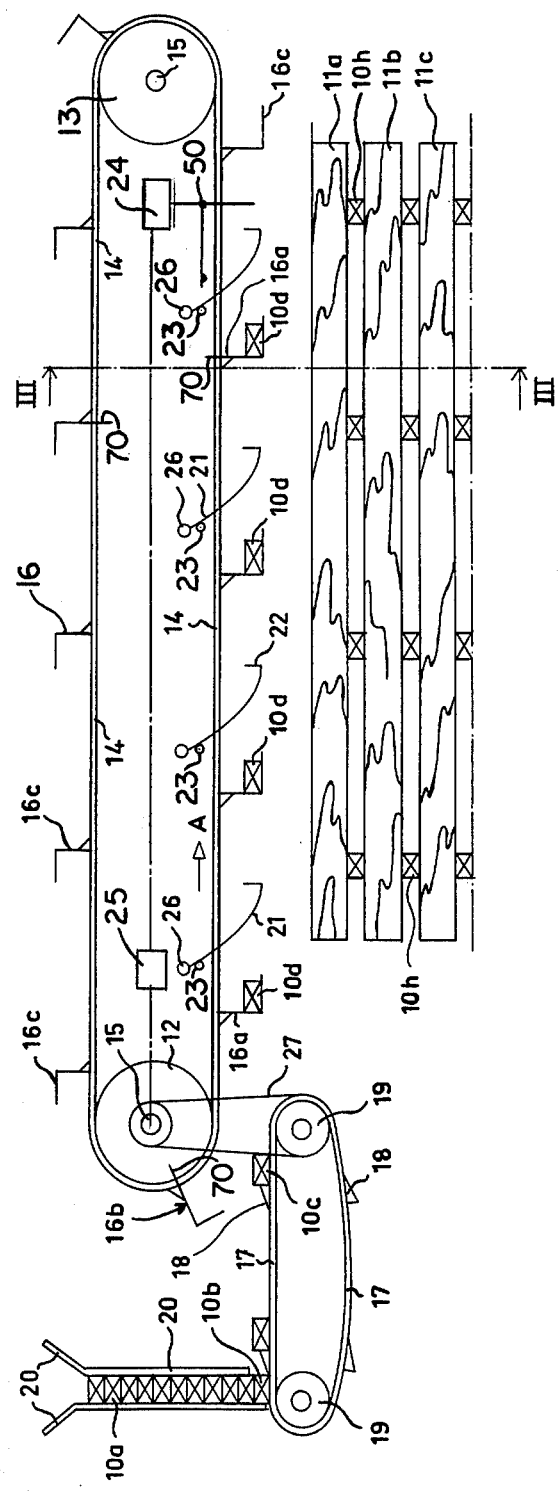
FIG. 1 illustrates in a schematic elevation an apparatus and method according to the present invention.

Referring now to FIG. 1, a plurality of stickers 10a are derived from the schematically illustrated magazine 20 which is shown at the left of FIG. 1. The stickers 10a, which are stored in the magazine 20, are fed by a feed means 17 to a conveyer means 14. The feed means 17 is in the form of a conveyer having a pair of parallel conveyer chains guided around sprockets 19. The pair of endless chains of the conveyer means 17 are each provided with a series of dogs 18 as illustrated. The sprockets 19 turn in a clockwise direction, as viewed in FIG. 1, so that the upper run of the conveyer means 17 moves horizontally toward the right, as viewed in FIG. 1. The construction of the magazine 20 is such that each dog 18 can move across the lower part of the magazine 20, engaging the rear surface of the lowermost sticker 10b which is in the magazine 20. In this way the lowermost sticker 10b will be displaced forwardly out of the magazine 20 and the stickers 10a will then move down to situate the next higher sticker in the position to be fed by the feed means 17. Of course a supply of stickers are maintained in the magazine 20 during operation of the apparatus and method of the invention.

The conveyer means 14 also includes upper and lower runs, as illustrated in FIG. 1, and these upper and lower runs of the conveyer means 14 form portions of a pair of parallel chains which are guided by sprockets 12 and 13, the right sprockets 13 of FIG. 1 also being illustrated in FIG. 3 where the pair of chains of the conveyer means 14 are also illustrated. The sprockets 12 and 13 are fixed to horizontal shafts 15 at least one of which is driven from any suitable drive. Thus, FIG. 1 schematically illustrates by way of the block 25 a suitable drive means operatively connected with the left shaft 15 of FIG. 1 for rotating the shaft 15 and the sprockets 12 in a counterclockwise direction, as viewed in FIG. 1, at a suitable speed. In this way the lower run of the conveyer means 14 will move toward the right, as viewed in FIG. 1. A suitable belt 27 which is situated outwardly beyond the space between the chains of the conveyer means 14 as well as outwardly beyond the path of movement of the stickers is connected to a suitable pulley fixed to the shaft 15 shown at the left of FIG. 1 as well as to a suitable pulley fixed to the shaft which carries the right sprockets 19 of FIG. 1, so that in this way the conveyer means 17 will be driven in synchronism with the conveyer means 14 at a suitable speed with respect thereto. The relationship between the speeds of operation of the conveyers 14 and 17, maintained by the belt 27, is such that substantially L-shaped support members 16 of the conveyer means 14 will successively receive stickers from the feed means 17 and convey these stickers along a horizontal path situated over a lumber stack which is being formed, as illustrated at the lower portion of FIG. 1. Thus, FIG. 1 illustrates a sticker 10c which is about to be engaged by a pair of support members 16b, these support members removing the sticker 10c from the feed means 17 and continuing the transportation of the sticker received from the feed means horizontally over the lumber stack which is being formed.

Of course, a support member 16b which is not apparent in FIG. 1 is situated directly behind the support member 16b which is schematically illustrated in FIG. 1, and the spacing between the pairs of aligned support members is such that they are situated either between the pair of chains of the feed members 17 or outwardly beyond the pair of chains, engaging portions of the stickers which also extend outwardly beyond the chains of the feed means 17, in this latter event.

The several pairs of transversely aligned support members 16 carried by the pair of chains of the conveyer means 14 all extend outwardly from the upper and lower runs of the conveyer means 14. The support members 16 are of a substantially L-shaped configuration and all have upright legs fixed to and extending downwardly from the lower run of the conveyer means 14 while having horizontal legs extending forwardly from the upright legs projecting downwardly from the lower run of the conveyer means 14, so that these lower legs extend forwardly in the direction of travel of the lower run of the conveyer means 14 from lower regions of the upright legs of the support member 16. Thus these upright legs of the support members 16 at the lower run of the conveyer means 14 becomes situated behind the stickers which are transported. As is apparent from FIG. 1, as each pair of transversely aligned support members 16 reach the position of the support members 16b indicated in FIG. 1, the lower legs of the support members at the position 16b are about to turn to an elevation situated beneath the sticker 10c with the upright legs of the aligned support members engaging behind the sticker 10c so as to cause the latter to be carried by the pair of support members which move beyond the position 16b forwardly and horizontally beyond the feed means 17. FIG. 1 shows four pairs of transversely aligned support members 16a which have previously successively received stickers from the feed means 17, and these pairs of support members 16a are shown at the position where they have almost located the four stickers 10d at a predetermined position over the uppermost layer 11a of the lumber stack which is being formed, in preparation to be deposited on the uppermost layer 11a so as to be in alignment with the previously deposited stickers 10h indicated in FIG. 1. Thus FIG. 1 schematically illustrates the method and apparatus of the invention during formation of a lumber stack which already has a plurality of layers of lumber 11a, 11b, 11c, etc. which are vertically spaced from each other by way of the stickers 10h indicated schematically in FIGS. 1 and 3. FIG. 1 indicates several pairs of transversely aligned support members 16c which are in a condition where they do not carry any stickers but are travelling with the remainder of the conveyer means 14. Thus, with the position of the parts shown in FIG. 1 the several stickers 10d are about to be deposited on the uppermost layer 11a of the lumber stack which is being formed.

When the several stickers 10d indicated in FIG. 1 have reached a predetermined position over the lumber stack which is being formed, these stickers 10d are removed from the support members 16a and deposited on the uppermost layer 11a. For this purpose, the structure of the invention includes a removing means made up of four pairs of transversely aligned removing members 21 in the illustrated example. The removing members 21 extend forwardly and downwardly into the path of travel of the stickers 10d as the latter approach the predetermined position over the stack where the removal operations are performed. Thus, as is shown schematically in FIG. 1 the elongated removing members 21 have upper concave surfaces and lower convex surfaces. Also at their lower forward free ends the removing members 21 have upwardly extending portions 22 which engage the rear surfaces of the stickers 10d in a manner described below. In the example illustrated in FIGS. 1 and 3, the several removing members 21 are supported for free turning movement by a support means which includes the stationary pivots 26 which provide for the removing members 21 horizontal turning axes which extend transversely with respect to the direction of movement of the conveyer means 14. A pair of the pivot pins 26 are schematically illustrated in FIG. 3. It is to be understood that the entire structure is supported by a framework which extends downwardly from above so as not to interfere in any way with the operations. Thus suitable support members extend either from the ceiling of the room or from upper supports of a framework which has side frame portions situated laterally beyond the structure illustrated in the drawings, so that in this way downwardly extending unillustrated support members can carry the pins 26 as well as the shafts 15 and other structure without interfering with the operation of the structure of the invention. The pivots 26 support the removing members 21 simply for free turning movement, and they are free to fall to the elevation illustrated in FIG. 1. For this purpose the unillustrated stationary supporting framework carries stop members 23, which are stationary and situated beneath the several removing members 21 so as to limit the downward movement thereof, thus situating the lower front ends of the support members 21 at the elevation of the stickers 10d.

As is apparent from FIG. 1, in the illustrated example the several removing members 21 extend downwardly into the path of movement of the stickers 10d which are about to be deposited on the uppermost layer 11a. As the stickers 10d approach a predetermined position over the lumber stack, they will themselves engage the removing members 21 and move them upwardly around the pivots 26. As the stickers 10d move beyond the removing members 21 the latter are free to fall back down into engagement with the stops 23 so as to become situated in this way behind the four stickers 10d which are illustrated in FIG. 1. Thus, as a group of four stickers 10d in the illustrated example are conveyed by the conveyer means 14 to a predetermined position over the stack, this group of stickers 10d will first raise the removing members while moving past the same and then permit them to drop to become situated behind the several stickers.

This operation is illustrated in particular in connection with the first of the four stickers 10d in FIGS. 2A-2D. It will be understood, however, that the following three stickers 10d operate the following three pairs of transversely aligned removing members 21 in the same way.

Referring to FIG. 2A it will be seen that the right sticker 10d of FIG. 1 is illustrated as it approaches the right pair of transversely aligned removing members 21a indicated in FIG. 2A. Thus, as is shown in FIG. 2A, the lower run of the conveyer means 14 is moving in the direction of the arrow A, and the illustrated sticker 10d is approaching the pair of removing members 21a which engage the stop members 23 in the manner illustrated in FIG. 2A.

Immediately subsequent to the stage of the operation indicated in FIG. 2A, the sticker 10d and the support members 16a illustrated in FIG. 2A have reached the position indicated in FIG. 2B during continued movement of the lower run of the conveyer means 14 in the direction of the arrow A, and thus, as shown in FIG. 2B, when the first of the four stickers reaches the position 10e indicated in FIG. 2B the first pair of removing members 21a, indicated in FIG. 2A, and corresponding to the right pair of removing members of FIG. 1, have been turned upwardly to the position 21b indicated in FIG. 2B. Thus it will be seen from FIG. 2B that the first pair of support members 21 when in the position 21b have been raised upwardly beyond the pair of stops 23 cooperating therewith.

This operation continues with the lower run of the conveyer means 14 continuing to move to the right in the direction of the arrow A, until the first of the group of four stickers reaches the position 10f indicated in FIG. 2C, and it will be seen that at this time the several stickers have indeed moved beyond the removing members which have dropped back down into engagement with the stops 23, so that the front upwardly directed ends of the support members which define push surfaces are now situated behind the stickers, as shown for the upwardly directed end or push surface 22a in FIG. 2C.

When the first of the group of four stickers 10d shown in FIG. 1, carried respectively by the group of support members 16a, has reached the position of the sticker 10f illustrated in FIG. 2C, the operation of the drive means 25 is terminated, and the direction of the drive for the conveyer means 14 is reversed so that the lower run of the conveyer means 14 now moves in the direction indicated by the arrow B in FIG. 2D. This reversal in the direction of operation of the conveyer means 14 is brought about by a control means 24 which is schematically indicated in FIG. 1 and which is illustrated in greater detail in FIGS. 2B-2D. While the pivots 26 which carry the right pair of support members 21 of FIG. 1 can be supported in suitable bearings to turn with these support members and can be used to actuate the control means 24, in the example illustrated it is the first sticker 10f shown in FIG. 2C which produces the operation of the control means 24 in the manner described below.

The reversal in the direction of movement of the lower run of the conveyer means 14 continues until the first of the group of four pairs of support members 16a reaches the position shown for the support members 16c in FIG. 2D. It will be noted that as a result of this reverse movement the rear surfaces of the stickers respectively engage the upwardly directed front ends 22 of the several support members 21 so that the stickers cannot move together with the support members which are undergoing a reverse direction of movement, once the upwardly directed portions 22 of the removing members engage the rear surfaces of the stickers. The lower horizontal legs of the support members move to the left, as viewed in FIG. 2D, slightly beyond the lower front ends of the removing members so that the several stickers are free to fall to the position shown for the sticker 10g in FIG. 2D and in this way the several stickers forming the group of four are free to drop onto the uppermost layer 11a, forming the next layer of stickers. Once the first of the group of four pairs of support members 16 reaches the position shown for the support members 16c in FIG. 2D, the direction of operation of the drive means 25 is again reversed by the control means 24 so that the conveyer means 14 again operates so that the lower run of the conveyer means moves in the direction of the arrow A, and now the above operations are repeated until the next group of four stickers become situated at the predetermined position shown for the sticker 10f in FIG. 2C. Then all of the above operations are repeated. After each group of stickers have been deposited on the uppermost layer of the lumber stack which is being formed, this lumber stack is lowered in a known way through the increment required for situating the next lumber layer on top of the deposited stickers, prior to deposition of the next groups of stickers on this uppermost lumber layer. Of course after a complete lumber stack has been formed it is removed in a known way and the formation of another lumber stack is carried out in the manner described above.

In the particular example illustrated, the control means 24 is actuated by way of a structure which includes a transversely extending rod 50 supported for free turning movement by any suitable unillustrated bearing structure. This freely turnable rod 50 fixedly carries a downwardly extending control arm 52 situated, for example, in a vertical plane extending midway between the right pair of removing members 21 of FIG. 1. Thus, as the first of the group of stickers reaches the position of the sticker 10f shown in FIG. 2C, the downwardly extending control arm 52 together with the rod 50 will be turned in a counterclockwise direction from the position shown in FIG. 2B to the position shown in FIG. 2C.

As is shown schematically in FIGS. 2C and 2D, the control means 24 is provided with a pair of switches 54 and 56. These switches are electrically connected in an unillustrated manner to a driving motor of the drive means 25 for operating the latter to bring about movement of the conveyer means 14 in the direction of the arrow A when the switch 54 is closed and in the direction of the arrow B when the switch 56 is closed. The rod 50 carries an upwardly directed arm 58 made of a suitable electrically non-conductive material and carrying a transversely extending electrically non-conductive arm 60 which at its opposite ends carries the switch closing members 62 and 64. Thus when the switch closing member 62 is in the position shown in FIG. 2D, the control means 24 will operate the drive means 25 to cause the conveyer means 14 to be operated in the direction of the arrow A at its lower run, while when the switch closing member 64 closes the switch 56, the drive is reversed and the lower run of the conveyer means 14 moves in the direction of the arrow B indicated in FIG. 2D. It will be seen that when the first of the group of four stickers reaches the position of the sticker 10f shown in FIG. 2C, the switch closing member 62 has been displaced to open the switch 54 while the switch closing member 64 has been displaced to close the switch 56, and thus the drive for the conveyer means 14 is reversed.

The rod 50 also has fixed thereto at a portion situated in the same vertical plane as the support members 16 fixed to one of the chains of the conveyer means 14 an arm 66 provided at its lower portion with a convexly curved projection 68. Moreover, the first of every group of four support members 16 situated in the same plane as the arm 66 carries an extension 70. In the position of the parts shown in FIG. 2B, the projection 70 of the first of the group of support members 16 has just moved beneath and past the projection 68 carried by the arm 66 which is fixed to the rod 50. However, when the first of the group of four stickers has reached the position of the sticker 10f in FIG. 2C, this sticker has turned the rod 50 and the parts carried thereby to the position shown in FIG. 2C, so that the arm 66 and the projection 68 has been lowered in the manner indicated in FIG. 2C. The bearing for the rod 50 may have with respect thereto sufficient friction to maintain the rod 50 in the position to which it is turned either by the first of the group of four stickers or by the projection 70.

Thus, with the above structure during the reverse movement of the conveyer means, when its lower run moves in the direction of the arrow B indicated in FIG. 2D, the projection 70 will come into engagement with the projection 68 and return the arm 66 to its substantially horizontal position, thus opening the switch 56 and closing the switch 54 so that the above operations are automatically resumed after the group of four stickers have been deposited on the uppermost layer of the lumber stack which is being formed. It will be understood that the arrangement of the parts is such that the projection 70 will not engage the arm 66 but will only engage the projection 68 and the turning of the arm 58 for closing and opening the pair of switches in the manner described above is substantially instantaneous. There is only a relatively small angle of movement for the rod 50 and the parts carried thereby and the inertia of the conveyer structure is sufficient to assure the alternate opening and closing of the switches 54 and 56 in the manner described above.

Thus, after the above operations have been repeated, the pair of support members shown at the position of the support members 16c of FIG. 2D will move to the right, as viewed in FIG. 2D, and these operations will continue until the first of the next group of four stickers reaches the position of the sticker 10f of FIG. 2C in order to repeat the above operations.

According to a further feature of the invention, it is not essential that a group of stickers simply be dropped onto the uppermost lumber layer of a stack which is being formed. Instead it is possible to permit the stickers to drop at only one end onto the uppermost lumber layer while the opposite ends of the stickers are received by suitable supporting projections which are gradually lowered for depositing the opposite ends of the stickers on the uppermost lumber layer, so that in this way it becomes possible to deposit the stickers in such a way that they are smoothly deposited without bouncing. Thus, when the stickers are removed from the support members 16 by way of the removing means in a manner described above, first one of the ends of the stickers are permitted to drop freely onto the uppermost lumber layer while at the same time the opposite ends of the stickers are transferred onto supports such as, for example, of the type disclosed in U.S. Pat. No. 3,823,834, or onto other equivalent supports, which are thereafter controlled in such a manner as to lower these opposite ends of the stickers onto the uppermost layer 11*a* of the stack which is being formed.

Thus, FIG. 5 fragmentarily and schematically illustrates one of the stickers 10*f* just after it has been removed from the pair of support members 16*a* shown in FIG. 2C. It is to be understood that the same operations go forward with the remaining stickers of the group which is being deposited on the uppermost lumber layer 11*a*. The left ends of the stickers, as viewed in FIG. 5, are permitted simply to drop down onto the uppermost lumber layer. However, the right ends, as viewed in FIG. 5, are respectively received on projections 72 which are in line with the stickers beneath the same just after the support members move in the reverse direction beyond the stickers to the position shown in FIG. 2D. Thus the right end of each sticker falls onto a projection 72. Each of these projections 72 is carried by a sleeve 74 which is freely turnable on a rod 76 which extends parallel to the direction of movement of the conveyer means 14. This sleeve 74 has in line with each sticker an upwardly directed arm 78 which is fixed to the sleeve and fixedly carries a hook 80 connected by way of a spring 82 to a threaded stud 84 provided with a nut 86 which engages a stop member 88 formed with an opening through which the threaded stud 84 passes. Thus by way of the nut 86 it is possible to adjust the tension of the spring 82. The upwardly extending arm 78 which is fixed to the sleeve 74 is urged by the spring 82 into engagement with an adjustable stop member 90 carried by an arm 92 which by way of a bolt and nut assembly 94 can be adjusted along the slot of a stationary support member 96 in the manner apparent from FIG. 5. Thus, with this construction the tension of the spring 82 and the position of the projection 72 can be adjusted in such a way that when the right end of a sticker is removed from a support member 16, this right end of the sticker, as viewed in FIG. 5, will fall onto the projection 72. The weight of the sticker is such that it will turn the sleeve 74 and tension the spring 82. Thus the projection 72 will be turned by the weight of the sticker, and the adjustment of the spring 82 is such that the sticker will slowly and gradually be deposited upon the uppermost lumber layer while moving past the projection 72 just before the right end of the sticker, as viewed in FIG. 5, reaches its position in engagement with the upper lumber layer 11*a*. Then since the sticker no longer engages the projection 72 the spring 82 contracts to turn the parts to the position shown in FIG. 5. Of course the assembly shown in FIG. 5 is duplicated for the several stickers, and in this way it becomes possible gradually to lower the several stickers at one of their ends onto the lumber layer and thus avoid undesirable bouncing of the stickers.

It is also possible, in accordance with a further feature of the invention, to provide a construction according to which the removing members 21 are maintained out of engagement with the stickers as the latter move beneath and past the removing members 21. Then, when the stickers reach the predetermined position over the stack at which the reversal of the conveyer means 14 is brought about, the removing members can be lowered so that the lower front ends are situated at the elevation of the stickers to engage the rear surfaces thereof to bring about removal of the stickers from the support members in the manner described above. After the removal operation is completed the removing members can be returned to their upper positions beyond the path of movement of the stickers.

For this purpose a structure as shown in FIG. 4 may be utilized. Thus in this case the several removing members 21, two of which are illustrated in FIG. 4, while still being supported by the pivots 26 at the same time carry pins 100 which are received in an elongated slot 102 of an elongated plate 104 which is fixed to the bottom end of an armature 106 of a solenoid 108 supported by any suitable stationary structure 110. The armature 106 carries a stop collar 112 which is pressed against the lower end of the coil of the solenoid 108 by way of a spring 114 which is coiled by the armature 106 above the solenoid winding 108 and which pressed against a collar 116 carried by the upper end of the armature rod 106. Thus, when the solenoid 108 is not energized the plate 104 will be situated at its upper elevation shown in FIG. 4, and at this elevation the several removing members 21 are maintained at an upper position upwardly beyond the elevation thereof shown in FIG. 2B, where these removing members 21 are out of the path of movement of the stickers as they travel to the predetermined position over the lumber stack which is being formed.

As is shown in FIG. 4, the switch 56, in addition to bringing about a reversal of the drive for the conveyer means 14 is electrically connected with the coil of the solenoid 108 so as to energize the latter when the first of the group of four stickers in the illustrated example reaches the position shown for the sticker 10*f* in FIG. 2C. Thus, as is apparent from FIG. 4, the switch 56 will be closed in the manner described above, and the energized solenoid 108 will lower the armature 106 in opposition to the spring 114, the parts being designed so that in the lower position of the armature 106 when the solenoid 108 is energized the removing members 21 are situated at the elevation shown in FIG. 2C. Of course the switch 56 remains closed during the entire movement of the lower run of the conveyer means 14 in the reverse direction shown by arrow B in FIG. 2D, so that through the structure of FIG. 4 the removing members 21 will be maintained in their lower removing positions until the switch 56 opens after the stickers have been removed from the support members, in the manner described above. Then the solenoid 108 becomes deenergized and the spring 114 expands to again return the members 21 of the removing means to their upper position beyond the path of movement of the stickers.

Other constructions are of course possible. Thus it is also possible to reverse the solenoid arrangement of FIG. 4, providing a construction where instead the removing members 21 are maintained in their lower position until the solenoid is energized whereupon the removing members 21 are raised. With such a construction the conveyer means 14 can carry suitable cams which move with the conveyer means 14. Suitable switches are situated in the path of movement of these cams to energize such a solenoid so as to raise the members 21 just before the stickers reach these members, with these solenoids becoming deenergized as soon as the stickers move beyond the removing members, so that the latter are then again automatically lowered to assume the position shown in FIG. 2C, whereupon the reversal of the conveyer means takes place as described above. Of course it is to be understood that the structure shown in FIG. 4 for the removing members 21 on one side of the conveyer means is duplicated for the removing members on the other side. For example the armature 106 can carry at its lower end a transverse bar which carries a pair of transversely aligned plates 104 cooperating in the manner shown in the manner shown in FIG. 4 with the two sets of removing members at each side of the conveyer means 14. Such a transverse bar connected to the lower end of the armature 106 will thus enable the structure of FIG. 4 to control the pair of transversely aligned plates 104 at the opposite sides of the apparatus to bring about simultaneous operation of all of the removing members 21.

While in the above description a plurality of stickers are situated between each of the successive lumber layers of the stack which is being formed, it is possible to provide an arrangement where one or more lumber layers are situated directly one upon the other and then a group of stickers are deposited. Thus the invention is equally applicable to stacks where stickers are not situated between each pair of successive lumber layers.

Thus, it will be understood that the invention is not confined to the details of the method and apparatus described above by way of example only. Many of these details may of course vary within the scope of the inventive concept covered by the claims which follow.

What is claimed is:

1. In a method for placing a plurality of stickers on the uppermost layer of lumber of a lumber stack during formation thereof, the steps of transporting a plurality of said stickers at a predetermined spacing from each other to a predetermined position situated over the uppermost layer of lumber while the stickers are respectively carried by substantially L-shaped support members forming a group of support members which travel horizontally with the stickers supported on horizontal legs of said L-shaped support members which extend forwardly in the direction of travel of the support members from upwardly directed legs of the support members which are situated behind the stickers in the direction of travel of said support members, said direction of travel defining forward and rear surfaces of the stickers, and said horizontal support member legs having free forwardly situated terminal ends, situating respectively behind the stickers when they reach said position over the uppermost layer of lumber a group of removing members for respectively removing the stickers from the group of support members, each of said removing members having a forwardly situated push surface, and, when the stickers have been transported on the group of support members to said position and said removing members are situated behind said stickers, terminating the forward travel of said group of support members whereby the rear surfaces of the stickers and the push surfaces of the respective removing members of said group of removing members are in opposed relationship with each other and reversing the movement of said support members to place the rear surfaces of the stickers in engagement with the respective push surfaces of said removing members and continuing the reverse movement of said support members while maintaining said removing members stationary so that the stickers are pushed by the removing member push surfaces beyond the forward free end of the horizontal legs of the supporting members whereby the stickers are then free to fall downwardly toward the uppermost layer of lumber.

2. In a method as recited in claim 1 and wherein said group of removing members are supported for movement upwardly from and back down to the elevation of said stickers in the path of movement thereof while said stickers are transported to said predetermined position, and while the latter approach said predetermined position moving said stickers into contacting relationship with said removing members so that said removing members are raised over said stickers, said removing members being free to move back down to said elevation when said stickers move out of contacting relationship with said removing members, so that the latter become situated behind said stickers.

3. In a method as recited in claim 1 and including the step of maintaining said group of removing members at an elevation higher than said stickers while the latter are transported to said predetermined position so that the stickers move past and beneath said removing members with the latter being maintained at said elevation higher than said stickers, and lowering said removing members to the elevation of said stickers when the latter have travelled beyond said removing members for situating the latter behind said stickers when the latter reach said predetermined position.

4. In a method as recited in claim 1 and including the step of displacing said removing members out of the path of movement of said stickers as the latter are transported to said predetermined position and past said removing members, and then situating the latter behind said stickers when the latter have moved beyond said removing members and are in the region of said predetermined position.

5. In a method as recited in claim 1 and wherein after the stickers are removed by said removing members from said support members the stickers are released to fall at only one end of each sticker onto the uppermost layer of lumber, and then placing the opposite end of each sticker on the uppermost layer of lumber.

6. In an apparatus for placing a plurality of stickers on the uppermost lumber layer of a lumber stack during formation thereof, conveyer means for conveying a plurality of stickers at a predetermined spacing from each other to a predetermined position situated over the uppermost lumber layer of a lumber stack which is being formed, said conveyer means having upper and lower runs and a plurality of substantially L-shaped support members carried by and projecting outwardly from said upper and lower runs with at least said lower run being substantially horizontal and transporting the support members projecting therefrom in a forward direction along a substantially horizontal path situated over the lumber stack which is being formed with the substantially L-shaped support members at said lower run having upright legs extending downwardly from said lower run and substantially horizontal legs extending forwardly from said upright legs in the direction of travel of said lower run at end regions of said upright legs which are distant from said lower run, said horizontal support member legs having free forwardly situated terminal ends in the direction of travel of said lower run, feed means situated adjacent said conveyer means for feeding stickers respectively to support members which carry the stickers received from the feed means along a substantially horizontal path over a lumber stack which is being formed while the support members project downwardly from said lower run, said stickers being supported by said supporting members such that said upright legs are adjacent to the rear surfaces of said respective stickers carried thereby as defined by the direction of travel of said lower run, removing means for removing stickers which reach said predetermined position from the support members carrying the same, each of said removing members having a forwardly situated push surface, support means supporting said removing means for movement away from and back to a removing position situated behind stickers which reach said predetermined position, means for terminating the forward travel of said support members so that the rear surfaces of the stickers and the push surfaces of the removing members are in opposed relationship with each other, and means for reversing the movement of said support members to place the rear surfaces of the stickers in engagement with the respective push surfaces of said removing members, means for maintaining said removing members stationary while said support members are reversely moved so that the stickers are pushed by the removing member push surfaces beyond the forward free end of the horizontal legs of the supporting members.

7. The combination of claim 6 and wherein said removing means includes at least two removing members situated beside each other behind each sticker at said predetermined position.

8. The combination of claim 6 and wherein said removing means includes a plurality of elongated removing members extending forwardly and downwardly into the path of movement of the stickers as the latter are transported by said conveyer means towards said predetermined position, said support means supporting said elongated removing members for pivotal movement upwardly out of the path of the stickers upon said stickers moving into contacting relationship with said removing members and back down to the removing position situated behind the stickers upon said stickers moving out of contacting relationship with said removing members.

9. The combination of claim 8 and wherein said support means supports said elongated removing members at the region of upper ends thereof for free turning movement about substantially horizontal axes which extend transversely to the direction of movement of the stickers as the latter are transported to said predetermined position by said conveyer means, so that the stickers themselves can displace said elongated removing members upwardly out of their path of movement.

10. The combination of claim 9 and wherein a plurality of stop members are situated respectively beneath said elongated removing members for limiting the free downward movement thereof with respect to said horizontal axes, respectively, to situate the push surfaces of said elongated removing members at the elevation of the stickers which are at said predetermined position.

11. The combination of claim 8 and wherein said elongated removing members terminate at their front lower free ends in upwardly directed portions defining said push surfaces for engaging the rear surfaces of the stickers.

12. The combination of claim 8 and wherein each of said elongated removing members are curved and are defined by a pair of opposed concave and convex surfaces so that upon said removing members being situated in its normal unmoved position, said concave surface faces upwardly and said convex surface faces downwardly.

13. The combination of claim 12 and wherein said elongated removing members respectively have front lower ends provided with upwardly directed portions defining said push surfaces for engaging the rear surfaces of the stickers.

14. The combination of claim 13 and wherein said support means supports said elongated removing members for free turning movement at upper end regions thereof respectively about axes which extend transversely with respect to the direction of travel of the stickers to said predetermined position thereof so that the stickers themselves are capable of raising said elongated removing members as the stickers approach said predetermined position while said elongated removing members are free to fall to a location behind the stickers after the latter move past said elongated removing members, and stop means situated beneath the elongated removing members for limiting the extent of downward turning thereof so as to situate the upwardly directed front portions of the removing members at the elevation of the rear surfaces of the stickers.

* * * * *